United States Patent [19]
Tancredi

[11] 4,033,683
[45] July 5, 1977

[54] IMAGE VIEWING APPARATUS

[76] Inventor: Henry J. Tancredi, 9 Lamplighter Lane, Gwynedd, Pa. 19436

[22] Filed: July 14, 1976

[21] Appl. No.: 705,069

[52] U.S. Cl. .................................. 353/7; 350/120; 350/122; 350/128; 350/131; 352/61; 353/78

[51] Int. Cl.² .................. G03B 35/20; G03B 21/56; G02B 27/22; G03B 21/28

[58] Field of Search .......... 350/120, 127, 128, 122, 350/131; 353/122, 7, 8, 9, 17, 78, 57; 352/60, 61

[56] References Cited

UNITED STATES PATENTS

| | | | |
|---|---|---|---|
| 1,864,946 | 6/1932 | Schrago | 350/120 |
| 2,525,596 | 10/1950 | Finn | 350/127 |
| 2,780,136 | 2/1957 | Erban | 350/120 |
| 2,974,564 | 3/1961 | Miller | 350/120 |
| 3,365,524 | 1/1968 | Thompson et al. | 350/127 |
| 3,781,102 | 12/1973 | Chandler | 353/78 |
| 3,796,484 | 3/1974 | Forster | 353/25 |
| 3,941,456 | 3/1976 | Schilz et al. | 353/122 |

Primary Examiner—Steven L. Stephan

[57] ABSTRACT

In an apparatus for viewing an enlarged image there are provided means adapted to project an image onto a reflective surface which in turn projects the image onto a moving screen. The angle of projection of the image onto the screen is maintained less than 10° from normal to avoid distortion. The moving screen comprises a flexible laminate having at least a lenticular like surface and a highly reflective surface which is rotated at high speeds causing the screen to assume a very flat plane of rotation without vibration.

17 Claims, 9 Drawing Figures

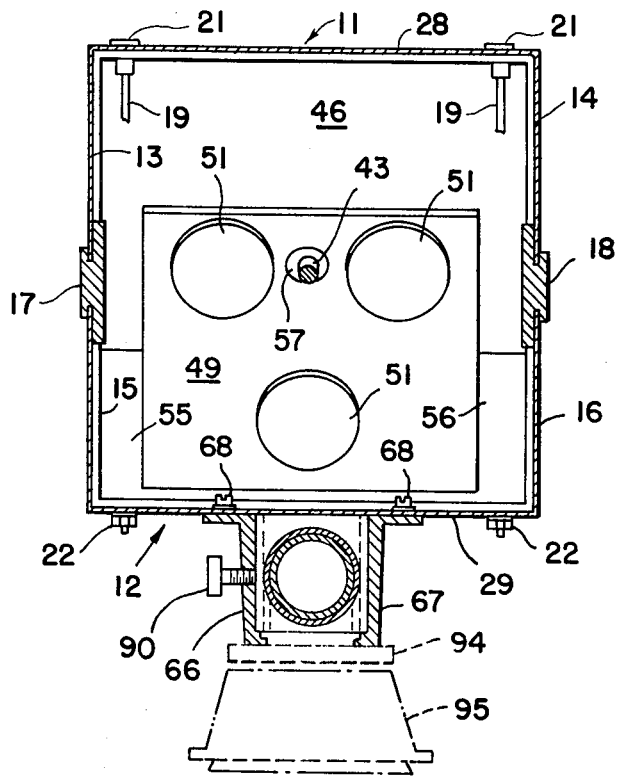
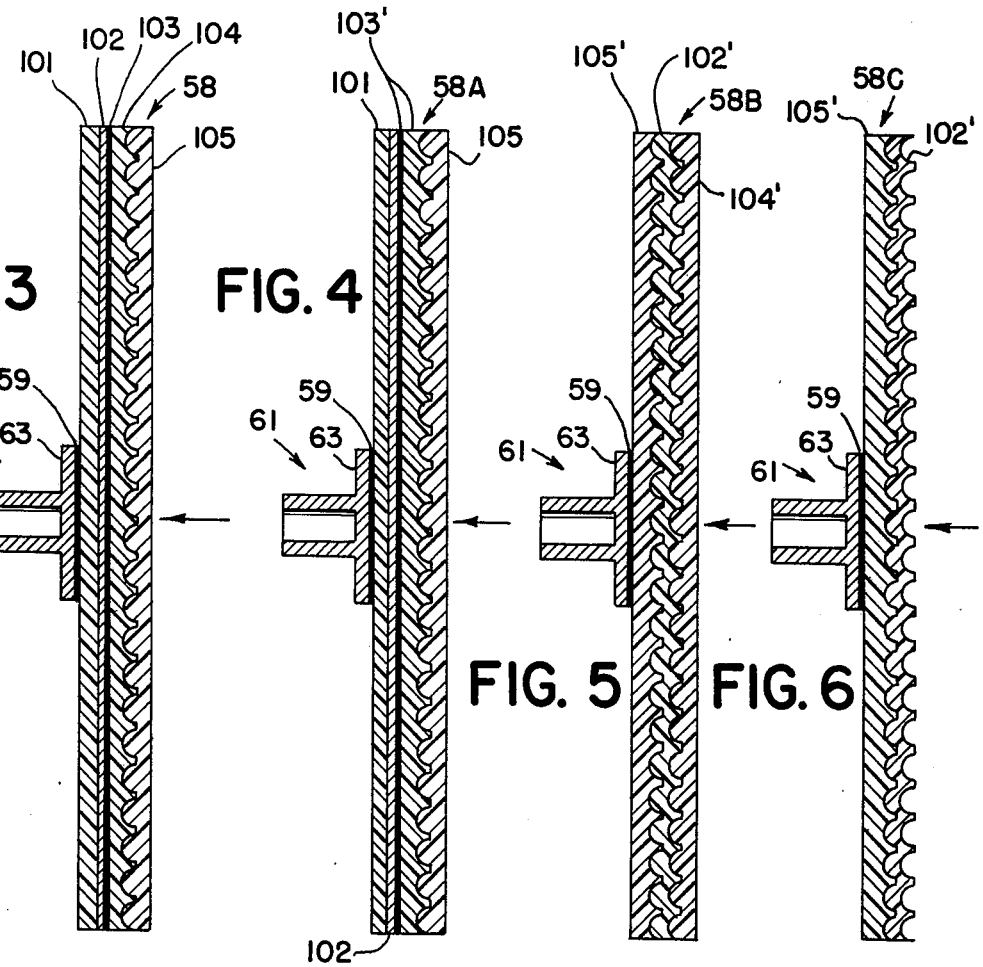

IMAGE VIEWING APPARATUS

BACKGROUND OF THE INVENTION

1. Field of the Invention

The present invention relates to projection screens, and more particularly to high speed rotating lenticular screens adapted to be rotated during projection to produce an enlarged exit pupil.

2. DESCRIPTION OF THE PRIOR ART

Moving projection screens are well known and are generally classified in class 350, subclasses 117 and 120 under moving projection screens. The prior art moving screens include projection screens having corrugations and/or protrusions as shown in U.S. Pat. No. 1,864,946. Such screens produce an image thereon which appears to have depth.

Prior art moving screens also include reflective screens having a plurality of curved surfaces which reflect light rays of a projected image. Such reflective screens as shown in U.S Pat. No. 2,132,904 tend to produce a three dimensional image effect.

Heretofore, moving Fresnel or lenticular lenses have been employed in projection systems either in front of or behind a diffussion screen or with no screen at all. When the projected image to be made visible to the observer is formed in or near the plane of the lens the motion of the lens has no effect upon the formation of the image and there is a secondary effect in that the exit pupil or cone of vision projected through or from the lens is enlarged. Typical of such teachings in the prior art are U.S. Pat. No. 2,583,373 and British Pat. No. 1,275,917.

Heretofore, prior art moving screen projection apparatus has in general provided high inertia low speed moving screens. Flexible endless belt screens have been employed over rollers, while rigid lens and screens have been orbited or revolved. None of the prior art moving screens have been extremely simple in design, low in cost and high in quality and brilliance and resolution. Some prior art screens have been curved to aid in compensating for distortion introduced by large angles deviating from a normal optical path.

Heretofore rotary screen projection apparatus has been expensive and unduly large. Such expensive rotary screen projection devices are difficult to assemble or service and their application has been restricted to expensive medical and scientific laboratory applications.

SUMMARY OF THE INVENTION

It is a primary object of the present invention to provide a very high quality moving screen projection apparatus which is simple in design and low in cost.

It is another primary object of the present invention to provide a moving screen projection apparatus having a novel moving screen structure.

It is another object of the present invention to provide a novel moving screen projection apparatus adapted to be combined with different mono or stereo objective lens in a self-contained viewing system.

It is an alternative object of the present invention to provide a moving screen projection apparatus adapted to receive a plurality of different adapter rings to enable the use of the same viewing apparatus with several different types of objective lens.

It is yet another object of the present invention to provide a novel moving screen projection apparatus which can be rapidly dismantled, cleaned and reassembled as a precision viewing apparatus without special tools or special training.

In accordance with these and other objects of the present invention to be set forth hereinafter, there is provided a split housing held in precision registration by four bolts and slotted structural members. Precision mounting devices in the housing permit easy removal of all the optical elements and their accurate replacement after cleaning. A novel light-weight flexible moving screen device is provided as a removable unit which mounts in slots in the housing for precision location. The novel moving screen is mounted on a small light weight mounting member which is perfectly balanced and mounted on the shaft of a high speed motor which is mounted on resilient damping means so that the high speed moving screen is almost perfectly flat as well as perfectly balanced. The optical path proceeding to the flat moving screen is maintained below ten degrees from normal to avoid distortion in the depth of field of the image on the flat screen.

BRIEF DESCRIPTION OF THE DRAWINGS

FIG. 2 is a section in fron elevation taken at lines 2—2 through a preferred embodiment viewing apparatus.

FIG. 3 is an enlarged section in elevation taken through a preferred embodiment flexible screen.

FIG. 4 is an enlarged section in elevation taken through a first modified embodiment flexible screen.

FIG. 5 is an enlarged section in elevation taken through a second modified embodiment flexible screen.

FIG. 6 is an enlarged section in elevation taken through a third modified embodiment flexible screen.

DESCRIPTION OF THE PREFERRED EMBODIMENT

Figure 1:
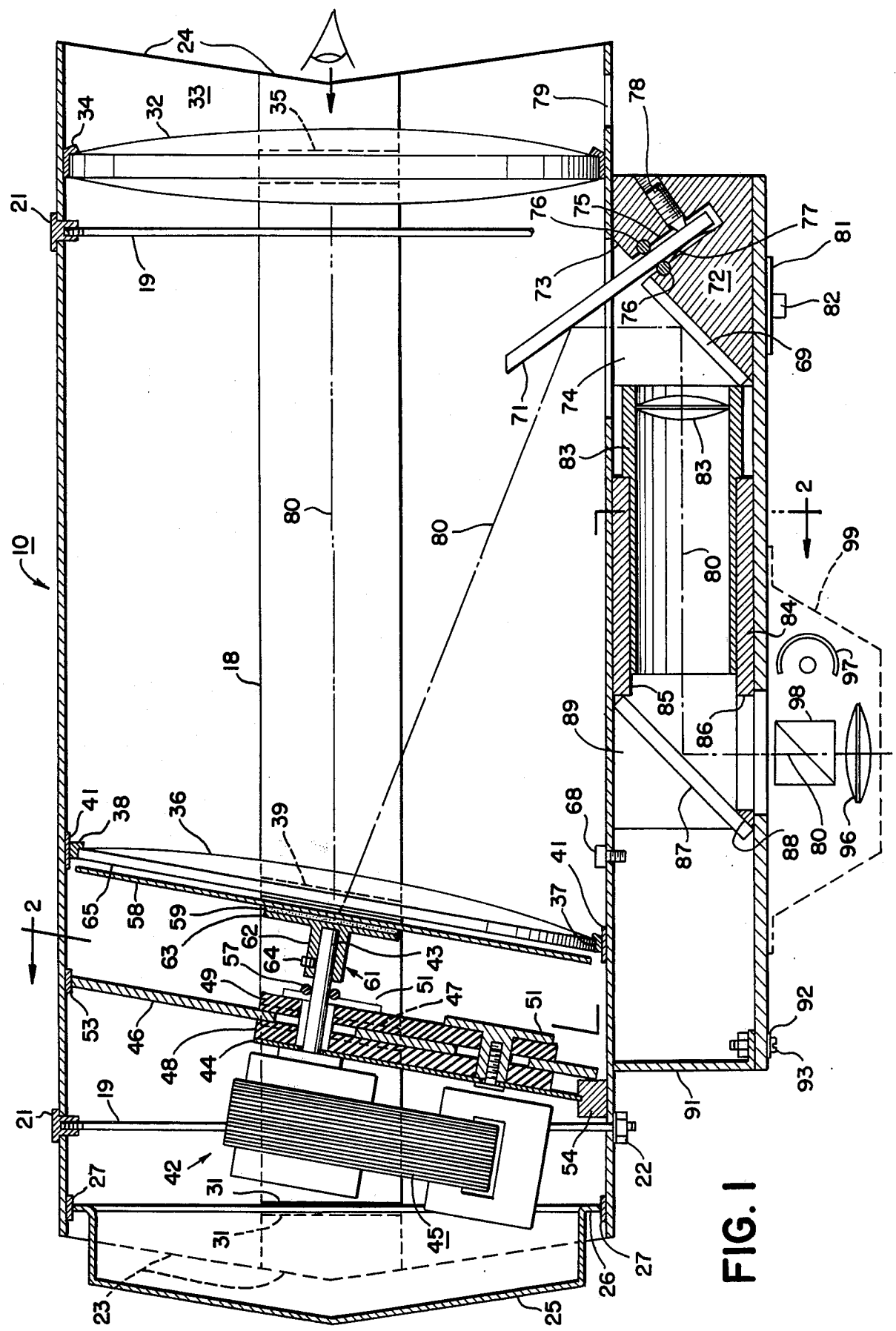
FIG. 1 is a section in side elevation taken through a preferred embodiment viewing apparatus.

Refer now to FIGS. 1 and 2 showing a preferred embodiment moving screen viewing apparatus. The housing 10 comprises upper and lower V-shaped members 11 and 12 having their vertical web member 13 to 16 fitted into slots of H-shaped structural members 17 and 18. Upper and lower members 11 and 12 are held together in members 17 and 18 by four threaded rods 19 each having a blind threaded cap 21 at one end and a nut and lock washer 22 at the other end. The threaded caps 21 may be attached to the rods by lock tight type adhesive. The ends of the H-shaped members 17, 18 and the ends of housing members 12,12 are machined to exactly match at lines 23,24 so that assembly of the rectangular housing 10 may be made without alignment match marks and other complex alignment devices.

The rear end of housing 10 is closed by a rectangular dome 25 having flanges 26 around the perimeter. There is a strip or small resilient pad of damping material 27 bonded to the horizontal webs 28, 29 of the upper and lower housing members 11, 12. Slots 31 in the sides of the H-shaped structural members 17, 18 are adapted to receive the flanges 26 of dome 25 and to precisely locate the dome 25 relative to the housing. It will be understood that slots 31 are shown larger than required for purposes of illustration, and need only provide enough clearance to permit insertion or removal by sliding the flanges into or out of the slots 31 when the upper housing member 11 is removed.

The front end of housing 10 extends outward from viewing lens 32 to provide a flare or glare hood 33. Viewing lens 32 is preferably rectangular in shape and is cemented into a shaped thin rectangular mounting frame 34. Frame 34 may be made of metal but is preferably made of a moldable shock resistant hard rubber or equivalent material. Frame 34 and viewing lens 32 are slidably mounted in slots 35 of H-shaped structural members 17, 18, shown enlarged for purpose of this illustration. It will be understood that the clearance for frame 34 in slots 35 need only be sufficient for ease of removal of insertion. In the preferred embodiment shown, the moulded frame 34 is shown with a slight taper on the base which cooperates with a matching taper in the slots 35. Since lower housing member 12 may be sprung open during cleaning or service, no side clearance is required for proper operation, thus viewing lens 32 may be located precisely during assembly.

Field lens 36 is preferably circular in shape and is cemented into a circular aperture 37 in rectangular mounting frame 38. The rectangular frame 38 may be cut from a thick plate of metal or rigid plastic. In the preferred embodiment shown the outer base edges of frame 38 are slightly tapered so that they will cooperate with a matching taper in slots 39 of H-shaped structural members 17,18. The slots 39 are precision milled in members 17, 18 at 10° to 12° from the vertical, thus, members 17,18 are either left hand or right hand and are not interchangeable. The precision milled slots 31 and 39 locate lens 32 and 36 at a predetermined fixed distance which is always the same when the apparatus is assembled. Thus, disassembling for cleaning or repairing does not require factory tooling.

Damping pads or strips 41 of thin resilient material may be cemented into the upper and lower housing members 11,12 to prevent any possibility of frame 38 moving vertically in slots 39 due to slight viberation.

Motor means 42 comprises a commercially available shaded pole low horsepower, high speed motor provided with a shaft 43 and a mounting plate 44. It will be understood that the type of motor is not important so long as it is substantially viberation free at speeds in excess of 2000 r.p.m. Should the motor be supplied without a mounting plate 44, a plate may be connected to the motor housing or frame, preferably spaced apart from the stator to permit cooling. In the embodiment shown, plate 44 is so connected by studs (not shown) extending from the frame 45 to provide a rigid member capable of supporting the weight of motor means 42.

Motor means 42 is positioned in housing 10 by a support plate 46 which fits into slots 47 (one side shown in H-shaped members 17, 18 in a manner similar to frames 34 and 38. On both sides of plate 46 there are provided resilient mats 48 and 49 which may be attached to the plate by adhesive, not shown. The mats 48 and 49 are preferably rectangular in shape and approximately the size and shape of mounting plate 44. Support plate 46 and mats 48, 49 are removably mounted to mounting plate 44 by large head internally threaded cap nuts 51 cooperating with screws 52. It will be understood that appropriate apertures are provided in the plates 44, 46 and mats 48,49 to accomodate the nuts 51 and screws 52.

Since motor means 42 is fixed relative to plate 44, but not plate 46, all vibration induced into motor means 42 through shaft 43 is damped out by mats 48, 49 which have a very low natural resonance and will damp out all the high frequency vibration of high speed motor means 42. Resilient gromets or washer may be substituted for the mats 48, 49 but do not provide as accurate parallel alignment of plates 44,46 nor do they absorb viberations as well.

Horizontal web 28 of upper housing member 11 is provided with a resilient strip 53 which applies a slight downward pressure on plate 46 which abuts the side of horizontal resilient rectangular block 54 affixed to horizontal web 29 of member 12. The full weight of motor means 42 is applied to rectangular block 54 thru plate 44 so that any vertical vibration is damped. Any transverser vibration is absorbed by vertical resilient rectangular blocks 55 and 56 which are affixed to vertical webs 15 and 16 of lower housing member 12. The various damping means are provided to eliminate vibration induced into shaft 43. Most high speed low cost motors have some clearance in the axial direction, however, at speed and under load the shaft and armature have a preferred axial direction, which usually biases the shaft into the motor housing and against the rear bearing designed to take thrust. An O-ring 57 is provided on shaft 43 to prevent any lubricant from moving down shaft 43 and being spun off in the area of the screen 58.

The moving screen 58, comprising a flexible laminate, as will be explained hereinafter, is attached by adhesive 59 to moving screen mounting means 61. Mounting means 61 comprises a precision turning having a cylindrical shaft adapter portion 62 and a disc shaped mounting portion 63. Preferably the turning is made of light weight metal such as aluminum or a rigid stable plastic so that no rotational vibrational forces are produced at very high speeds in excess of 2000 R.P.M. The shaft adapter portion 62 may be provided with a threaded aperture for receiving a small set screw 64. In a preferred embodiment show having a five inch diameter flexible screen the small set screw 64 in aluminum mounting means 61 did not introduce a noticable vibration. In apparatus requiring larger screens and mounting means 61, adhesive may be employed on shaft 43 to connect hub 62 without any imbalance.

It will be understood that mounting means 61 is only a preferred way to manufacture shapes with a flat mounting surface 63 and that other equivalent symmetrical shapes may be substituted by any skilled machinest.

Preferably, moving screen 58 is attached to hub mounting means 61 and then hub 61 is mounted on shaft 43 at an exact predetermined distance from plate 46. In this manner the relative distance between screen 58, viewing lens 32 and field lens 36 is fixed and the components will assume their relative position even though removed and replaced during cleaning because slots 31, 39 and 47 maintain their fixed position. As will be explained hereinafter, moving screen 58 is preferably assembled as a laminate and die cut into a circular shape with a center marker provided for purposes of mounting on hub 61. When the flexible screen 58 is rotated at high speed it will become substantially flat and parallel to the rear surface 65 of field lens 36.

A pair of symmetrical Z-shaped extension rails 66 and 67 are connected by screws 68 to the bottom horizontal web 29 of housing member 12. The rails 66 and 67 form the support for the reflective surface means and the projection means. In the preferred embodiment shown the reflective means comprises two first surface mirrors 69 and 71 mounted on a precision milled rectangular block 72. Fixed mirror 69 is cemented onto inclined surface 73 which was made by milling a slot in the center of block 72 more narrow than the width of block 72 leaving two triangular shaped ears 74. Adjustable mirror 71 is supported in a transverse slot 75 extending transversely through block 72. Mirror 71 is entrapped between two pivot pins 76 also extending transversely through block 73. A curved leaf spring 77 in slot 75 biases mirror 71 toward adjustment screw 78 in block 73 which is reached through access hole 79 in housing member 12. It will be noted that mirror 71 extends upward into housing 12 and is in front of viewing lens 32. It has been discovered that while mirror 71 can be seen by an observer, it is not seen nor does it obstruct the field of view of the image on screen 58 by an observer looking at the screen 58. This feature permits the optical path line 80 to intercept the flat screen at an angle less than ten degrees from normal. In the preferred embodiment the optical path 80 intercepted the screen at less than eight degrees from a perpendicular, which exceeds the requirement for distorsion free images employing a microscope objective. Block 72 is clamped to rails 66, 67 after mirror 71 is adjusted to focus the image in the center of screen 58 by a transverse plate 81 and screw 82 threaded into block 72. It will be understood that the optical path 80 may be adjusted and that the angle of support plate 46 may be changed to provide distorsion free images over a wide range of projection lens.

Microscope objective 83 in the preferred embodiment is a commercially available 10x to 20x power eyepiece objective such as those made by NIKON, Bausch and Lomb or Ziess. In a preferred embodiment use where the projection apparatus is mounted on an existing microscope, the microscope projection lens 83 may be removed from the customer's microscope and placed in eyepiece block 84. Thus, it will be understood that the term projection lens means and projection means refers to the eyepiece block 84 with or without a lens in place and/or an adapter ring placed in the optical path between the customers microscope and the reflective surface means comprising at least a single mirror like mirror 71.

Eyepiece block 84 is preferably rectangular in shape and is provided with a horizontal cylindrical bore 85 for receiving objective projection eyepiece lens 83. A vertical cylindrical bore 86 is in the end of block 84 provides the entrance optical path 80 which reflects off of first surface mirror 87 cemented onto incline surface 88 of block 84. The inclined surface 88 is provided by milling an inclined slot in the end of block 84 across the intersection of bores 85 and 86. The slot is more narrow than the width of block 84, thus, leaving a pair of triangular ears 89.

Eyepiece block 84 is removable from the end of Z-rails 66,67 by removing end plate 91 held in place by tension plate 92 and screw 93. This permits the changing of eyepieces in block 84 if desired. Eyepiece block 84 is held in place by clamp screw 90 threaded through Z-rail 66.

It will be understood that the image viewing apparatus of FIGS. 1 and 2 may be sold with or without objective projection lens 83 and that adapter rings 94,95 like those shown in phantom lines can be employed to mount the viewing apparatus on a microscope.

The viewing apparatus may be provided with a lens system 96 and a light system 97 having a beam splitter 98 housed in a housing 99 (shown in phantom lines) adapted to be mounted onto Z-rails 66,67 or directly onto housing member 12.

Refer now to FIGS. 3 to 6 showing novel flexible moving screens of the type successfully employed in the present invention. Screen 58 may be prepared as a fine element laminate and then die cut into a perfect circle before being cemented onto hub 61 by adhesive 59. The plastic layer 101 is preferably thin and highly flexible having a first surface mirror 102 vacuum deposited thereon. The plastic may be selected to be compatible with the deposited mirror surface. Lenticular laminate 104 105 comprises an embossed surface layer 105 and a thermoplastic layer 104 which is molded face to face thereto without destroying the embossments. Lenticular layer 104,105 is substantially transparent and refracts or bends the light rays passing therethrough. The lenticular laminate 104,105 could have been provided with a second surface mirror layer, but it was found that there was a tendency for the layers 104,105 to delaminate when exposed to heat and high vacuum. Accordingly, the mirror surface 102 was placed on a separate layer 101 and layers 101,102 and 104,105 were joined by a clear adhesive layer 103. Adhesive layer 103 may be sprayed onto one of the adjacent surfaces 102 or 104 or may be provided in sheet form having double sticky surfaces.

Screen 58A is a modified form of screen 58 wherein the thermoplastic laye 104 is eliminated. The embossments on layer 105 are connected to first surface mirror 102 by a clear adhesive layer 103' which fills the void between layers 102 and 105. Layers 101,102 and layer 105 may be joined by first placing a resilient clear adhesive layer 103' on the mirror surface 102, then joining layer 103' to embossed layer 105 by employing a roller in a manner which eliminates air entrapment therebetween. When properly applied, the adhesive layer 103' will not deform layers 101,102 and 105. It would appear that in FIG. 4 that a curved second surface mirror 102 could be deposited directly onto lenticular embossed layer 105 and the adhesive 103' added behind. This may be done, however, it changes the optical characteristics because lenticular layer 105 does not then act as a double refractive optical layer.

Screen 58B, shown in FIG. 5, comprises a lenticular layer 105' which has a pattern of reverse embossments. A first surface mirror 102' is deposited onto layer 105' and a transparent thermoplastic layer is applied to the front surface for protection against dust and polutants in the air. The smooth flat outer surface of protective layer 104' aids in maintaining the optical surfaces clean. Screen 58C, shown in FIG. 6, is a modified form of screen 58B in which the protective layer 104' has been removed. The danger in using an embossed surface with an exposed first surface mirror is that the surface will oxidize and become dull or collect dust, and become dull. While a first surface mirror enclosed in a housing will be protected to some extent, it is believed best to keep the mirror protected with protective polish or even a very thin sprayed on coat of optionally clear plastic.

The screens 58, 58A, 58B and 58C are preferably made of flexible layers of plastic. The lenticular layers may be made of less flexible plastic to assure that the lens patterns are maintained uniform. The lenticular layers 104,105 were made of flexible material which would hold a circular shape. The layer 101 and the mirror 102 deposited thereon were made highly flexible and would not support themselves until attached to layers 104,105 by adhesive layer 102. When the screens 58 were attached to disc 63 of hub 61 by adhesive 59, the screen did not droop or bend so as to touch field lens 36. All screens shown assumed a substantially flat plane when rotated at high speeds.

It was observed that the image on screen 58 was of uniform brightness and presented no noticable circles at speeds as low as 1800 R.P.M. employing high quality reflective surfaces and lens. When the screen 58 is properly centered on hub 61 it may be rotated at speeds in excess of 3600 R.P.M. without vibration. The flexibility of the screen enhances its self balancing characteristics and permits the screen to assume a substantially flat optical surface. Due to the flatness of screen 58 and its parallelism to field lens 36, and the low angle of divergence from a normal optical path, an extremely sharp image may be protected onto screen 58. No special corrective field lens was needed and the screen 58 need not be curved to compensate for distorsion in the system or to create a larger exit pupil.

A very bright image is obtained by using large aperture corrected projection lens to introduce a large amount of light. The bright image is maintained by using short distances between the projection lens systems and the moving screen and the bright image is not dispersed or distorted by employing a highly efficient screen having reflective surfaces. Screen 58, shown in FIG. 3, is the least efficient element in the system and was made to reflect about 94 percent of the light projected thereon. The lenticular surface of screens like screen 58 may be selected from numerous types of commerically available embossed surfaces or may be designed especially to enlarge the exit pupil the minimum amount necessary to enhance viewing. Such special lenticular surfaces will vary slightly depending on the projection lens system employed.

Having explained two reflective lenticular surfaces and two refractive lenticular surfaces employed in FIGS. 3 to 6, it will be understood that numerous other light weight flexible self balancing screens providing very high reflective flat disc surfaces would be operable in the present viewing apparatus.

Figure 7:
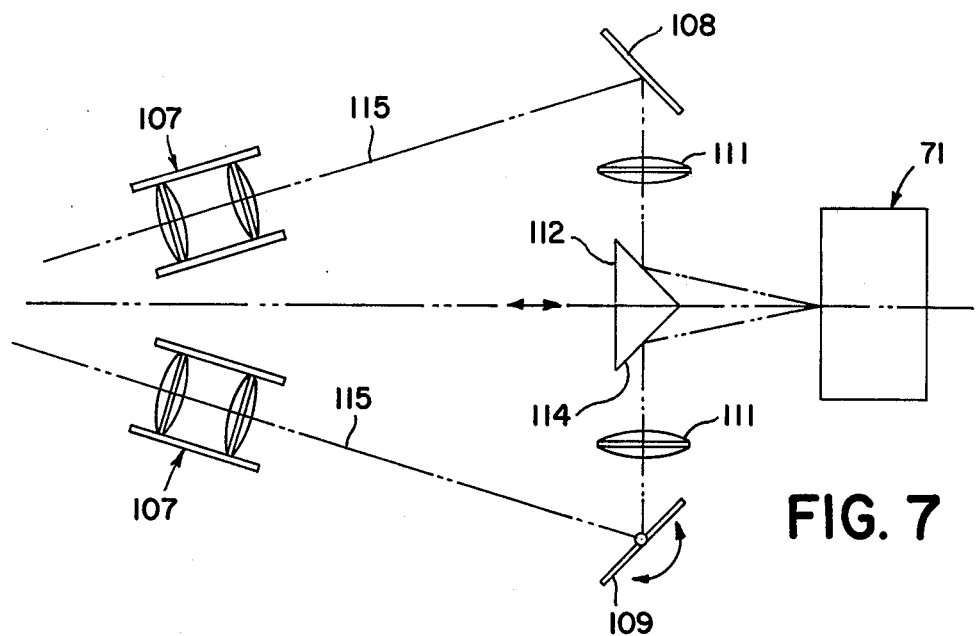
FIG. 7 is a schematic representation in plan view of a stereo optic projection lens system of the type adapted to be employed with the present invention.

The preferred embodiment of the present invention has been explained with reference to projection lens means comprising an eyepiece block 84 with or without a single projection lens 83. FIG. 7 shows in schematic representation in plan view a stereo optic projection lens system for presenting two superimposed images on a moving screen 58 after being directed by a single reflective mirror 71 of the type shown in FIG. 1. The objective lens systems 107 each comprise two or more individual lens elements and are preferably of the type providing high optical speed (f opening), excellent definition and illumination and no distorsion. Such lenses are well known and commercially available for microscopes, projection systems and cameras. The image from the upper lens 107 is reflected from mirror 108 through eyepiece lens 111 and from reflective prism surface 113 onto reflective means 71. In similar manner the image from lower lens 107 is reflected from adjustable mirror 109 through eyepiece lens 111 and from reflective prism surface 114 onto reflective means 71. Prism 112 is mounted for slidable movement as shown by the arrows which permits convergence of the optical paths 115. The lower optical path 115 is further adjustable by mounting mirror 109 in a manner which permits pivoting movement, as shown by the arrows, for extremely fine adjustment. While gross and fine adjustments are shown for converging the images in a horizontal plane as viewed on screen 58, similar adjustments may be provided to converge the images in a vertical plane as viewed. In the system shown in FIG. 7 the two stereo objective lens 107 are mounted for movement together to provide for proper focusing upon an object (not shown).

Figure 8:
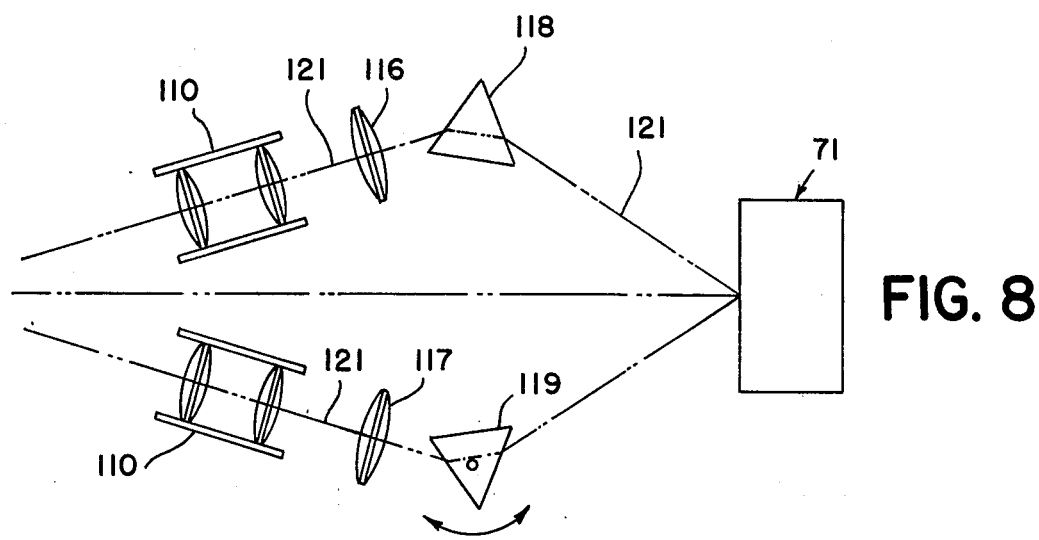
FIG. 8 is a schematic representation in plan view of another stereo optic projection lens system.
Figure 9:
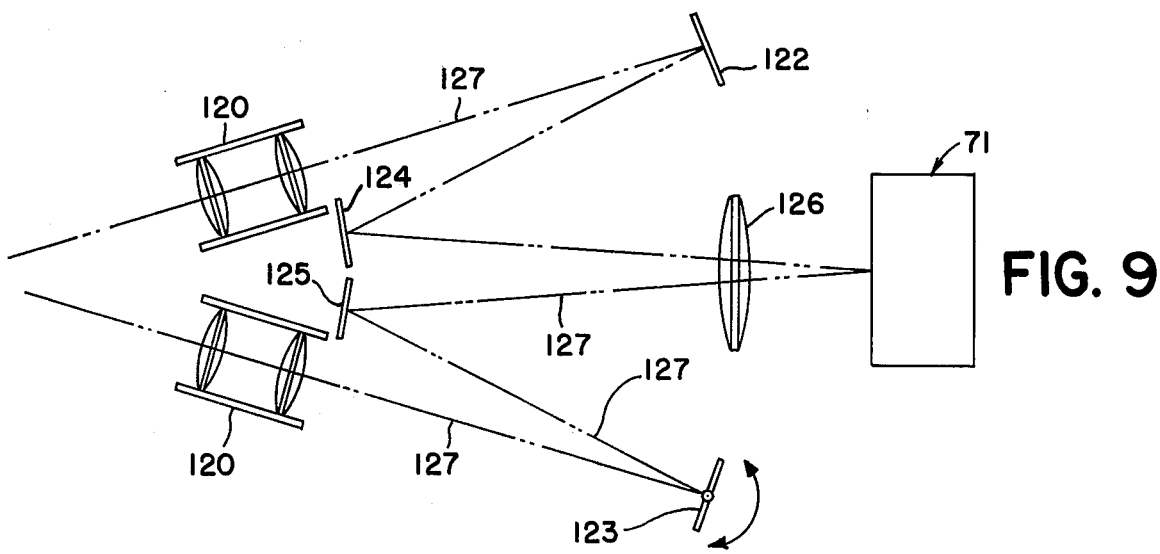
FIG. 9 is a schematic representation in plan view of yet another stereo optic projection lens system.

FIG. 8 shows in schematic representation a modified form of stereo optic projection lens system. In this system the stereo objective lenses 110 direct their individual images through eyepiece lens 116 and 117 which are similar to objective lens 83 in FIG. 1. The optical paths 121 are converged by passing through a fixed prism 118 and a pivoted prism 119, mounted for movement as shown by the arrows. The two images are reflected from lens means 71 onto screen 58 where they are superimposed upon each other. It will be understood that the optical paths 121 may be very close to each other and that prism 118,119 may be mounted back to back on a movable block so as to provide convergence of the images in the horizontal plane. Since objective lenses 110 can be mounted in a horizontal plane with provision for slight vertical adjustments no vertical adjustment of the images is required in the field. FIG. 9 shows in schematic representation another modified form of stereo optic projection lens system which can be employed with the viewing apparatus of FIGS. 1 and 2. The upper objective lens 120 directs its individual images to a pair of fixed mirrors 122, 124 and through an oversize eyepiece lens 126 to reflective means 71. The lower objective lens 120 directs its image to a pivotally adjustable mirror 123 and then to a fixed mirror 125 and through the eyepiece lens 126 to reflective means 71. The system shown in FIG. 9 provides a long optical path.

It will be understood that the microscope lens system 96 shown in FIG. 1 is removed when projection lens systems shown in FIGS. 7 to 9 in plan view are substituted therefor. Thus, it will be understood that the same basic viewing system in housing 10 may be used for a large number of applications. The viewing system can be mounted on mono or stereo microscopes. If the microscopes are not provided with internal or external lighting systems provision has been made to include a light system below the housing 10.

The viewing system is adapted to be assembled with a complete optic and lighting system for use with all types of machinery and/or assembly operations over the large range of industrial and scientific microscopes. The complete optic system may be used as a very accurate jewelers loop for demonstrating the cut, color and purity of precious stones. The complete optic system employing stereo optic lenses is particularly useful for colposcopes and other medical applications because the apparatus is small and compact yet light in weight enabling it to be positioned very near the object to be enlarged and viewed. Because the viewing systems is highly efficient, less light is required and the device may be used to look into the eye without harmful effects.

Having explained the novel mechanical features of the invention and illustrated their use in combination with several alternative objective systems, other objective systems may be coupled to the novel viewing apparatus by those skilled in the art of optics.

I claim:

1. Apparatus for viewing an enlarged image comprising:

a housing.

projection lens means mounted in said housing and providing an enlarged projected image of an object to be viewed and for projecting said image along an optical path proceeding from said projection lens means, reflective surface means mounted in said housing in said optical path proceeding from said projection means, field lens means mounted in said housing having a front surface in said optical path proceeding from said reflective surface means and having a rear surface opposite said front surface, moving screen means mounted for rotary movement in said housing juxtaposed said rear surface of said field lens means providing a substantially flat surface having optical embossments thereon in said optical path proceeding from said rear surface of said field lens means, said moving screen means comprising a light weight flexible plastic disc having a highly reflective surface thereon, moving screen mounting means having a shaft adapter and a disc shaped moving screen mounting portion, means for attaching said moving screen mounting portion to a center portion of said moving screen means, motor means mounted in said housing and having a rotatable shaft fixed in said shaft adapter of said moving screen mounting means, and viewing lens means positioned in said optical path proceeding from said screen means and said field lens means for viewing an enlarged image on said moving screen means from the front of said field lens means.

2. Apparatus as set forth in claim 1 wherein said moving screen means comprises a flexible plastic laminated disc which conforms to a substantially flat plane when rotated by said motor means.

3. Apparatus as set forth in claim 2 wherein said flexible plastic laminated disc comprises a laminate having a reflective layer and an embossed lenticular layer.

4. Apparatus as set forth in claim 3 wherein said embossed lenticular layer comprises two embossed lenticular layers connected in surface to surface contact and providing two outer smooth layers.

5. Apparatus as set forth in claim 4 wherein said reflective layer comprises a flexible plastic layer and a coating of highly reflective metal bonded thereto.

6. Apparatus as set forth in claim 5 wherein said reflective metal coating is applied to said flexible plastic layer as a first surface mirror and said first surface mirror is connected to said embossed lenticular layers with a transparent adhesive and said moving screen mounting means is connected to said reflective layer at the side opposite said first surface mirror.

7. Apparatus as set forth in claim 1 wherein said moving screen means comprises an embossed flexible plastic disc which rotates in a flat plane when rotated at high speed by said motor means, and further comprises a first surface mirror reflective surface applied to the embossed surface juxtaposed said field lens means.

8. Apparatus as set forth in claim 1 wherein said moving screen means comprises a raised embossed flexible plastic disc which rotates in a flat plane when rotated at high speed by said motor means, and further comprises a first surface mirror reflective surface applied to a highly flexible thin plastic sheet which is attached to said raised embossed flexible plastic disc by a filler adhesive which is substantially optically clear.

9. Apparatus as set forth in claim 1 wherein said moving screen means comprises a reflective screen having a coefficient of reflectivity of greater than ninety percent.

10. Apparatus as set forth in claim 1 which further includes means for pivotally mounting at least one reflective element of said reflective surface means for adjustably positioning said optical path being directed toward said moving screen means.

11. Apparatus as set forth in claim 10 wherein said means for pivotally mounting a reflective element of said reflective surface means comprises a pivot rod on each side of said reflective surface means, screw means cooperating with one side of said reflective surface means, and spring means biasing said reflective surface means into engagement with said screw means.

12. Apparatus as set forth in claim 1 which further includes objective lens means mounted in said housing in front of said projection lens means between said object and said projection lens means.

13. Apparatus as set forth in claim 12 wherein said objective lens means comprises a stereo pair of lenses and further includes means for coverging the two optical paths proceeding from said objective lenses on said reflective surface means.

14. Apparatus as set forth in claim 13 wherein said means for converging the two optical paths further includes means for adjusting at least one of said two optical paths.

15. Apparatus as set forth in claim 1 wherein said reflective surface means comprises a mirror for projecting said enlarged image on said moving screen means, said mirror being positioned in the field of view of said viewing lens means but not in the direct viewing path of said moving screen means.

16. Apparatus as set forth in claim 1 wherein said motor means comprises a flat mounting plate slidably mounted in grooves in said housing and resilient means for mounting said motor on said mounting plate.

17. Apparatus as set forth in claim 16 which further includes resilient mounting means on the bottom of said housing for supporting said motor means in said grooves in said housing.

* * * * *